Dec. 19, 1944.   A. O. WILLIAMS   2,365,369
TRUCK BRAKE
Filed Sept. 29, 1943    4 Sheets-Sheet 1

INVENTOR.
Alfred O. Williams
BY Walter E. Schirmer
Atty.

Dec. 19, 1944.　　　A. O. WILLIAMS　　　2,365,369
TRUCK BRAKE
Filed Sept. 29, 1943　　　4 Sheets-Sheet 2

INVENTOR.
Alfred O. Williams
BY Walter E. Schirmer
ATTY.

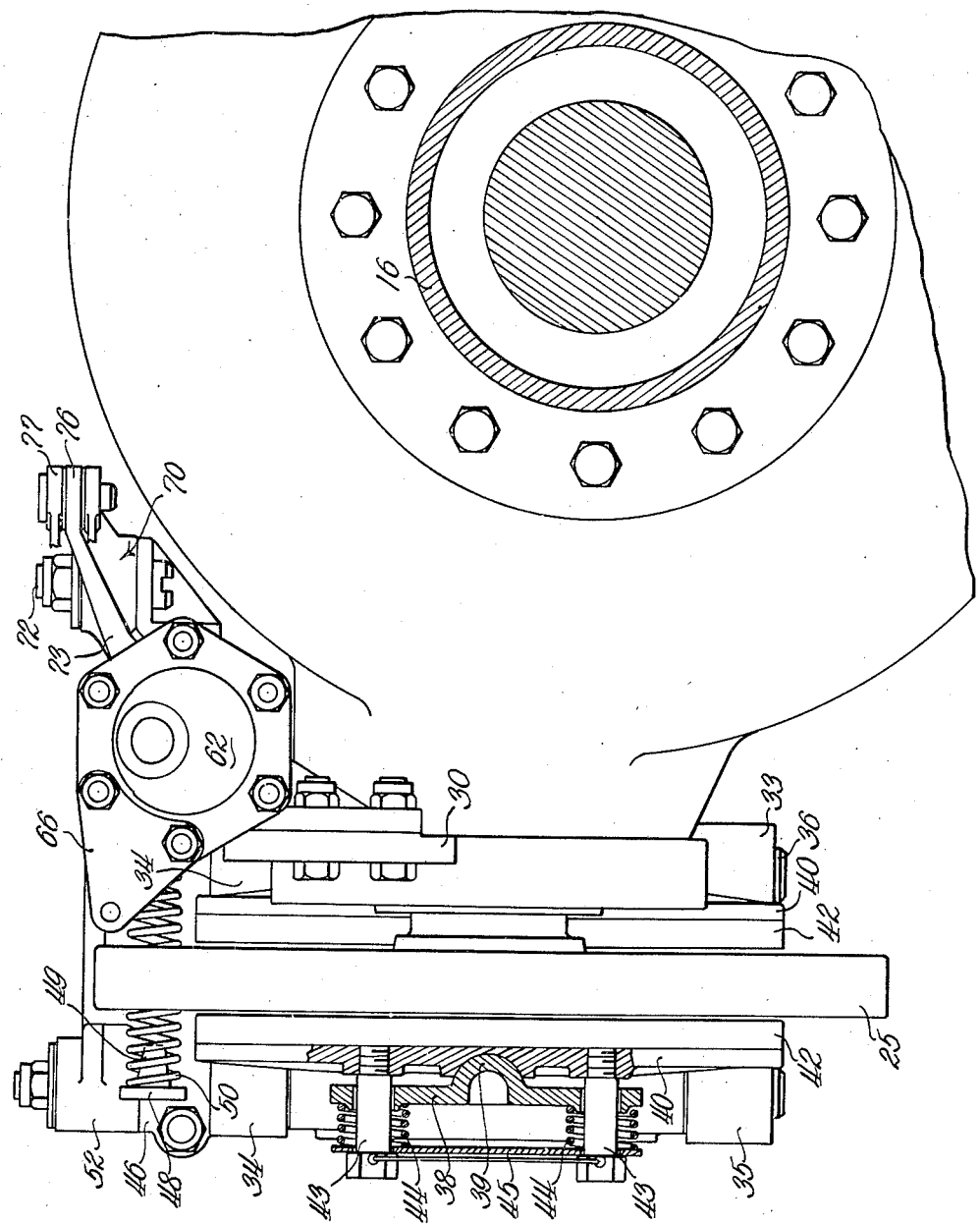

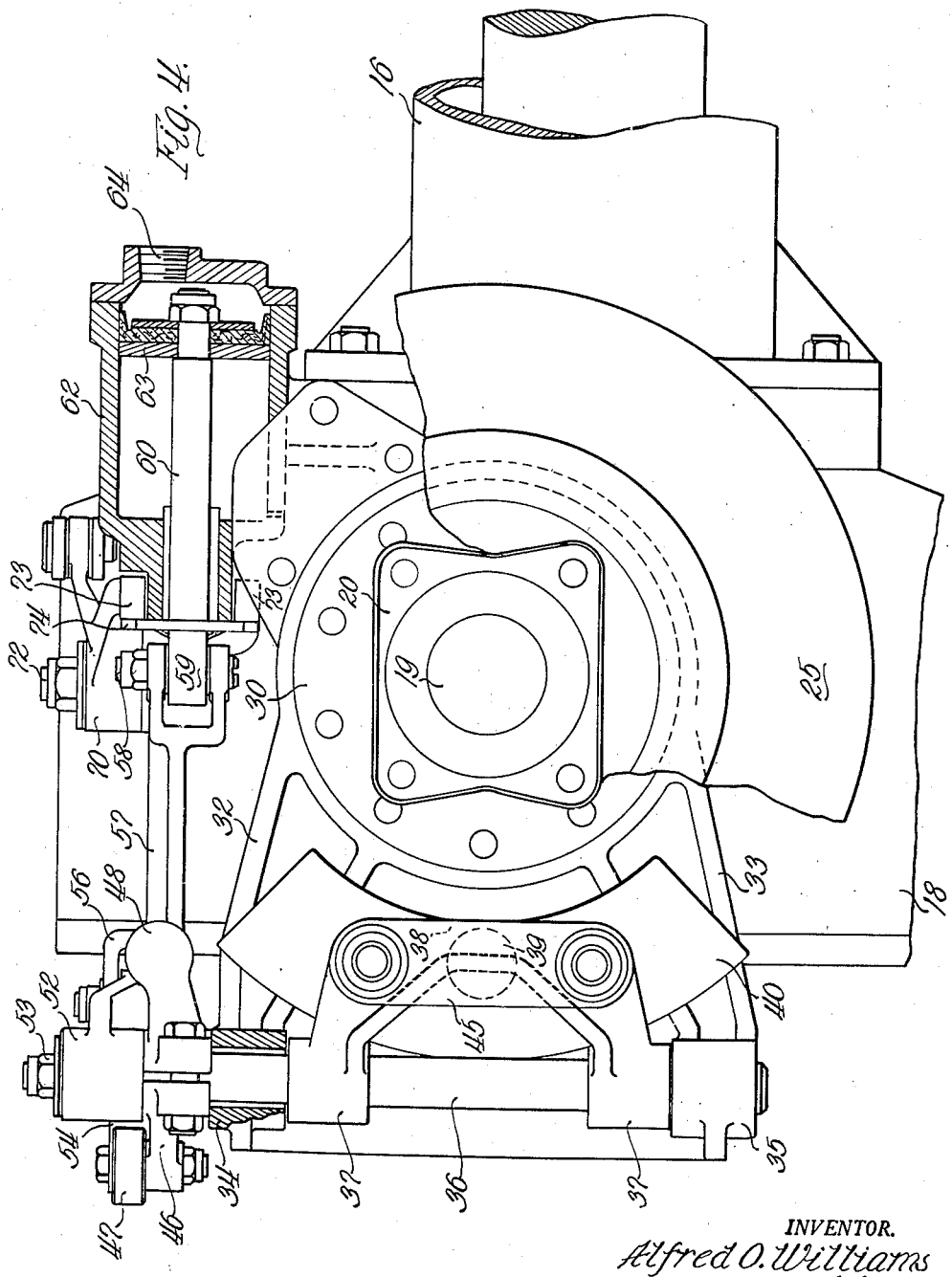

Patented Dec. 19, 1944

2,365,369

UNITED STATES PATENT OFFICE 2,365,369

TRUCK BRAKE

Alfred O. Williams, Battle Creek, Mich., assignor to Clark Equipment Company, Buchanan, Mich., a corporation of Michigan Application September 29, 1943, Serial No. 504,214

9 Claims. (Cl. 188—73)

This invention relates to truck brakes, and more particularly is concerned with a provision of propeller shaft braking means for a rail truck such as is used on street cars, elevated and subway trains, and similar urban and interurban service.

It has become increasingly desirable, from the standpoint of quietness of operation and elimination of noise, to provide some braking system for such trucks other than the conventional type of tread brake shoes heretofore employed.

Tread brake shoes have been found to be extremely noisy, require the provision of a cross arm and actuating means at the ends of the truck, and are subject to rapid wear and consequently high maintenance charges.

The present invention contemplates a brake construction in which a brake is provided between the motor or prime mover and the shaft which drives the truck axle. In most trucks of this type an electric motor is provided as the source of power and is carried directly on the truck, being connected through suitable gearing to the axle of the truck by means of a propeller shaft. However, the present construction is equally applicable to trucks using other types of prime movers, the fundamental principle involved being the provision of braking means carried by the truck within the confines of the truck frame and preferably acting on the drive shaft leading to the axle.

In such constructions it is essential that the brake be simple in operation, positive in action and be so designed as to be accessible for any maintenance or inspection that may be desired. In addition, the brake should be capable of power actuation such as through air pressure or electrically, and should also be capable of manual actuation in case the source of power is for some reason disturbed. Preferably such manual actuation is through a hand brake control lever mounted in the cab of the vehicle and connected through a flexible cable to the brake mechanism.

One object of the present invention is to provide a rail truck having means in addition to the magnetic track brake and the regenerative braking through the motor for decelerating the vehicle by means of braking means acting directly on the drive shaft.

Still another object of the present invention is to provide such a construction in which the actuation of the brake can be made either manually or by suitable power means.

Still another object of the invention is to provide such a construction which is readily accessible, contains no parts which cannot be reached without disassembly of the truck and which is simple in design yet positive in operation.

Other objects and advantages of the present invention will appear more fully from the following detail description which, taken in conjunction with the accompanying drawings, will disclose to those skilled in the art the particular construction and operation of a preferred form of the present invention.

In the drawings:

Figure 3 is a side elevational view, partly in section, of the brake construction; and Figure 4 is an end elevational view, partly in section, of the brake construction.

Figure 1:
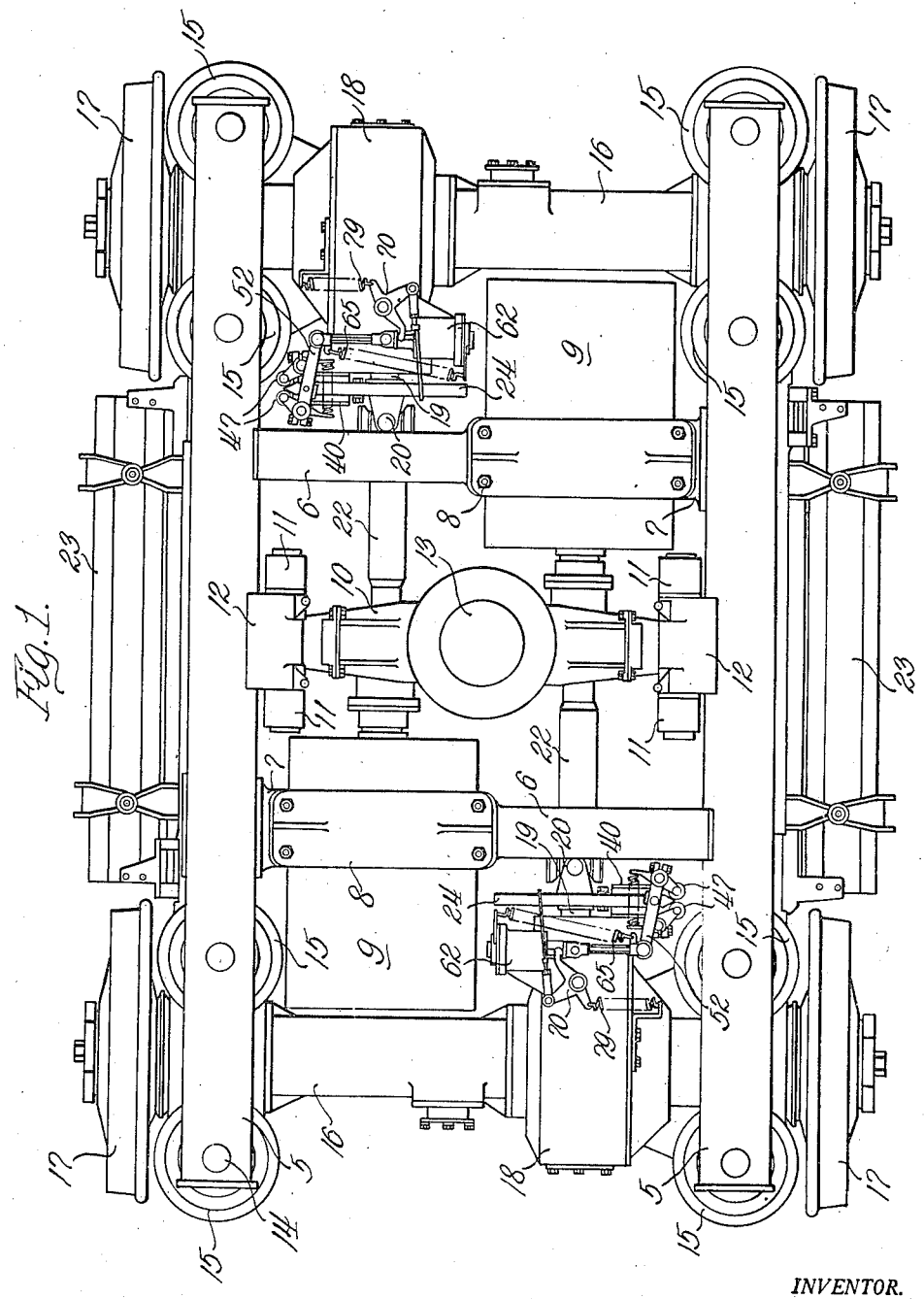
Figure 1 is a top plan view of a rail truck embodying the present invention.

Referring now in detail to the drawings, the truck itself is designated generally in Figure 1 and comprises the side frame members 5 which are laterally spaced apart by transverse spacing members 6, the members 6 in turn having suitable cradle portions 7 and arcuate members 8 forming fixed supports for the electric motors 9 which are arranged on opposite sides of the truck and in longitudinally spaced relationship. Extending transversely across the truck in the center thereof is the swing bolster 10 which is pivotally mounted through the links 11 to bracket members 12 secured to the side frame members 5. The bolster 10 is arranged for lateral swinging movement within the side frame members and is provided with the king pin 13 for receiving one end of the car body.

Adjacent their ends the side frame members 5 are provided with depending posts 14 extending into suitable spring pots 15 using steel coil springs or the like whereby the side frame members 5, the motor 9 and the bolster 10 are resiliently supported in suitable journals carried by the axle housings 16 extending transversely of the truck at opposite ends thereof. Each of the housings 16 encircles a solid axle shaft upon which the wheels 17 are pressed, and intermediate the ends the housing is separated as indicated at 18 to provide an enlarged housing carrying a ring gear (not shown) pressed on the axle shaft and driven from a suitable pinion on a pinion shaft 19 extending inwardly from the housing 18 and connected by means of universal couplings.

Mounted on the outer sides of the side frame members 5 intermediate the wheels 17 are magnetic track shoe brakes 23 which are used for adhering to the rail upon which the truck operates to provide positive stopping of the truck. Since these brakes form no part of the present invention it is not deemed necessary to describe them in detail.

Figure 2:
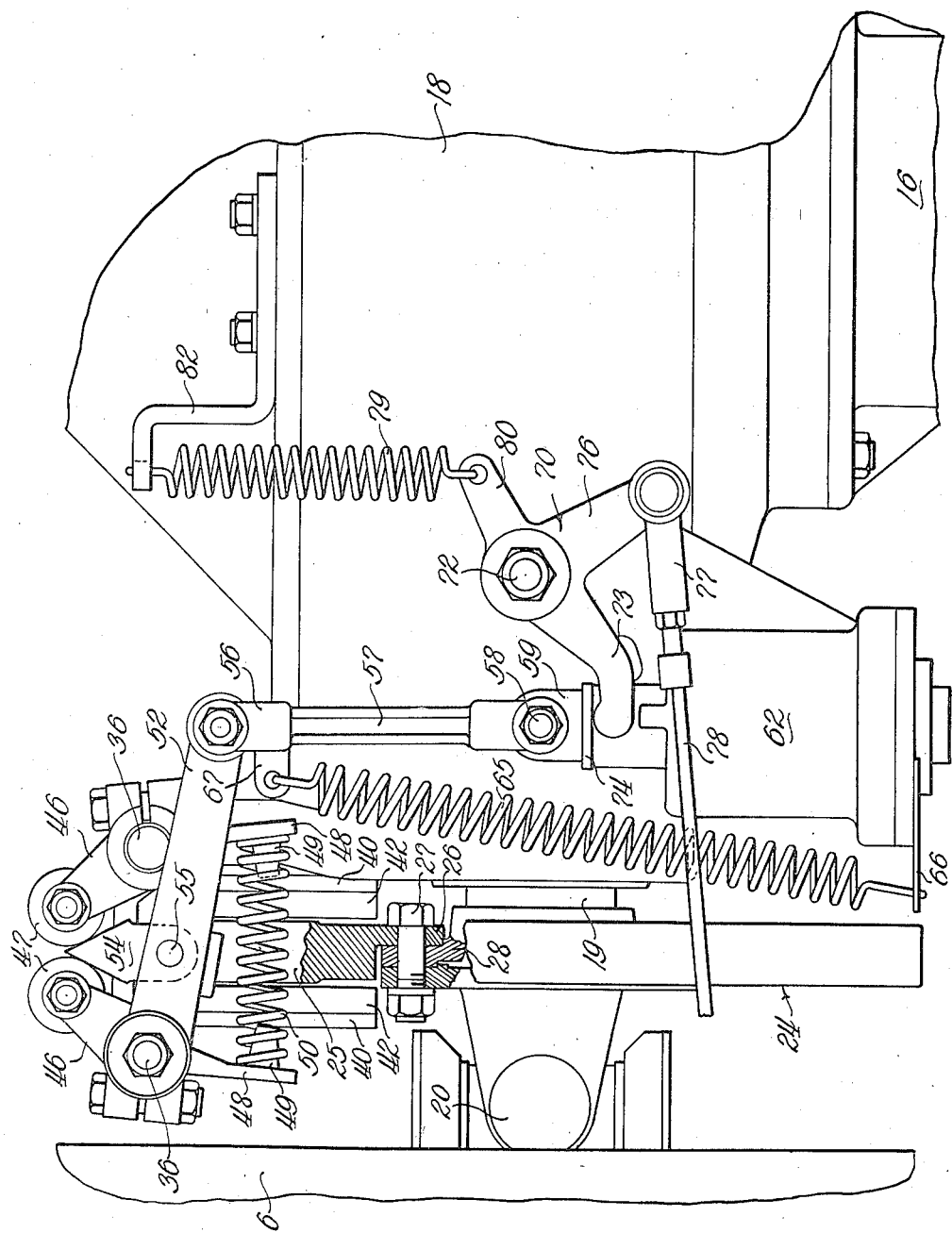
Figure 2 is a detail view of the brake mechanism for one of the drive axles of such truck.

In order to eliminate the necessity for using tread brake shoes operating on the treads of the wheels 17, I have found that the desired braking action can be more efficiently produced by means of braking mechanism operating on the shafts 19 leading into the gear housings of the axles. For this purpose I provide on the ends of these shafts adjacent the universal couplings 20 annular brake discs 24. This disc is more clearly shown in Figure 2 and comprises an annular disc member 25 having an inwardly extending flange portion 26 bolted by means of an annular series of studs 27 to a flanged collar 28 splined or otherwise keyed to the shaft 19 whereby the one mating member of the universal coupling, the collar 28 and the shaft 19 are all journalled with the brake disc 25 for conjoined rotation. It will thus be apparent that the disc 25 rotates in a substantially vertical plane and about an axis substantially at right angles to the axis of the axles within the housing 16. Mounted on the face of the inwardly extending portion of the housing 18 is a suitable bracket 30 which is bolted or otherwise rigidly secured to this housing and having laterally spaced extending arms 32 and 33 arranged to provide vertical spaced supports or bosses 34 and 35 for two vertically extending shafts 36, the shafts being laterally spaced on opposite sides of the disc 25 and beyond the periphery thereof. The shafts are preferably journalled by means of suitable bushings within the collars 34 and 35 whereby the shafts are capable of rotation within these collars. Intermediate the collars 34 and 35 the shafts are adapted to receive the journal portions 37 of a bracket arm 38. The arm 38, as shown more in detail in Figure 3, is provided with a spherical seat portion 39 receiving the brake shoe 40 having a suitable braking surface 42 such as any conventional type of brake lining which is adapted to engage the radial face of the disc 25. The shoe 40, it will be noted, is arcuate in section and in design and has an arcuate extent of somewhat less than 50% of the circumferential extent of the brake surface on the disc 25, preferably being about one quarter of this surface to provide for adequate dissipation of heating during braking action. The shoe 40 is arranged to swivel around the seat 39 and for this purpose there are provided two studs 43 extending through enlarged openings in the arm 38 and secured at their ends in the shoe 40. Suitable springs 44 encircle each of the studs and draw the shoe up against the seat 39. A suitable spring plate 45 is provided extending between the studs 43 as shown in Figure 4.

At the upper ends of each of the shafts 36 there is clamped crank arms 46 which terminate at one end in cam rollers 47 and at the opposite end in suitable boss portions 48 having pin projections 49 forming seats for a coil compression spring 50 extending between the opposite arms 48. The spring 50 normally spreads the ends 48 of the arms 46 apart, forcing the roller ends 47 toward each other and consequently rotating the shafts 36 in opposite directions to spread the arms 38 apart for maintaining the shoes spaced away from the radial face of the disc 25.

Mounted on the upper end of the shaft 36 which is disposed furthest away from the housing 18, there is provided a lever 52 which is freely rotatable relative to the shaft and is held on the end thereof by means of a nut 53. The lever 52 intermediate its ends is provided with the double bevel cam member 54 pivotally mounted as by pin means 55 in the lever and arranged to enter between the cam rollers 47 of the arms 46. From an inspection of Figure 2, it will be apparent that upon movement of the lever 52 in a counter-clockwise direction the cam 54 will be forced between the rollers 47, thereby spreading the rollers apart to bring the shoes into braking engagement with the surface of the disc 25 against the pressure of the spring 50. Upon movement of the lever 52 in the opposite direction the cam 54 is withdrawn and the spring 50 thereupon rotates the shafts in opposite directions to move the shoes 40 away from the surface of disc 25.

At its free end the lever 52 is connected to a clevis 56 which in turn is connected through arm 57 and pin 58 to the end 59 of a piston rod 60 extending into the cylinder 62 mounted on the top of housing 18. The piston rod 60 has the piston 63 at its inner end arranged for reciprocatory movement within the cylinder 62 and is so arranged that upon admission of fluid under pressure the piston 63 will be moved to the left as shown in Figure 4, and consequently will move the piston rod 60 to the left thereby producing counter-clockwise movement of lever 52 to produce application of the brake shoes against the disc 25. Return of the piston to the position shown in Figure 4 is accomplished by means of the spring 65 secured at one end to a plate 66 carried on the outer end of cylinder 62 and at its opposite end secured to the boss 67 carried by the clevis 56. This spring normally urges the piston toward a brake released position and upon release of pressure within the cylinder 62 the piston will return to the position shown in Figure 4 thereby withdrawing cam 54 from within rollers 57.

It is desirable in any construction of this type that in addition to the fluid operation of the brakes it is desirable that the brakes also be capable of application manually. To this end I have provided a crank 70 mounted as by means of stud 72 adjacent the top of the housing and having one arm 73 thereof arranged to engage against a stud collar 74 carried on the external end of piston rod 60 adjacent the clevis connection of arm 57 to the piston rod. The arm 73 engages the collar 74 on opposite sides of the piston rod 70 to thereby provide uniform pressure on the piston rod.

A second arm 76 on the crank arm 70 has a clevis 77 connected to the end thereof and connected through the cable 78 to a hand brake control mechanism mounted at a remote point, preferably within the cab of the vehicle, whereby tension upon the cable 78 will rotate the arm 70 to produce the same braking action as is provided by admission of fluid into the cylinder 62. A suitable release spring 79 is provided between the arm 80 of the crank 70 and a bracket 82 bolted or otherwise secured to the housing 18. With this construction it will be apparent that the spring 79 returns the arm 73 to inoperative position whenever the hand brake mechanism is released, and in conjunction with the spring 65 allows the brake actuating mechanism to return to inoperative position whenever the pressure is released in cylinders 62 or the hand brake mechanism is returned to inoperative position.

It will be seen from the present construction that all of the parts of the brake mechanism are accessible, and that the actuating mechanism therefor being disposed on the upper side of the truck can be reached with a minimum of difficulty. In addition, the design of the truck is such as to render its installation and connection to trucks now in use very easily so that this particular brake mechanism can be applied to present trucks in operation without materially changing any design of such trucks.

It is therefore believed apparent that I have provided a novel type of propeller shaft brake mechanism for rail trucks of simple design which is readily accessible for maintenance and inspection or for assembly or replacement.

I am aware that changes may be made in certain details of the present construction, and it is to be pointed out that certain features of the present invention such as the provision for adjustment of the brakes by means of the clamping of the arms 46 on the ends of the shafts 36 can be accommodated without requiring dis-assembly of the construction. Preferably, the clamp portions of the arms 46 extend about knurled portions of the shafts 36 so that adjustment of the position of the shoes 40 relative the rollers 47 can be obtained.

I therefore do not intend to be limited to the exact details shown and described, but only insofar as defined by the scope and spirit of the appended claims.

I claim:

1. In a rail truck having a drive shaft, a brake disc secured to said shaft, brake shoes arranged to engage opposite radial surfaces of said discs, arms providing universal support for said shoes, a pair of shafts spaced laterally of said drive shaft and providing rock shafts for said arms, cam means secured to the upper of said shafts, spring means normally biasing said shafts and arms toward inoperative position, a lever pivotally mounted on one of said shafts and carrying a cam engageable with said cam means to rotate said shafts for applying said brakes, and means including a power-actuated piston for actuating said lever.

2. The combination of claim 1 wherein said last-named means also includes an independent manually operable means for actuating said cam.

3. The combination, with an axle housing having a drive shaft extending therein, a brake disc on said shaft, and a pair of brake shoes pivotally mounted for movement toward and away from opposite radial faces of said disc, of means for actuating said brake shoes comprising a pair of parallel vertical shafts having means for supporting said shoes therefrom, cam means keyed to the upper ends of said shafts, a cylinder mounted on said housing, piston means in said cylinder operated by fluid pressure, and lever means between said piston means and cam means and carrying a cam engaging said cam means for transmitting motion from said piston means to said shafts.

4. The combination of claim 3 including means for returning said piston means and lever means to inoperative position upon release of said fluid pressure.

5. The combination of claim 3 further characterized by the provision of crank means pivotally mounted on said housing and having an actuating portion engaging said piston means, and remotely controlled manually operable means for actuating said crank means to move said piston means toward operating position independently of said fluid pressure.

6. In combination, an axle housing having an enlarged ring gear enclosing portion, a drive shaft extending thereinto, a brake disc on said shaft, a support on said housing portion, a pair of parallel vertical shafts on said support on opposite sides of said disc, arcuate brake shoes, means carried by said shafts and universally supporting said shoes for movement toward and away from said disc, cam arms on the upper ends of said shafts, a lever pivotally mounted at one end on one of said shafts and carrying a cam engageable with said cam arms, a cylinder mounted on said support parallel to said disc, and piston means in said cylinder connected with the free end of said lever.

7. The combination of claim 6 further characterized by a crank arm pivotally mounted on said support and engageable with said piston means for manually actuating said lever.

8. In combination, an axle housing having an enlarged drive gear portion including a normally extending projection, a drive shaft extending into said projection and having a brake disc thereon adjacent said projection, a support on said projection carrying a cylinder extending parallel to the plane of said disc, a piston reciprocal in said disc, a pair of vertically extending shafts disposed on opposite sides of said disc and laterally offset from said shaft, support members keyed on said shafts and extending on opposite sides of said disc, brake shoes carried by said support members for engaging said disc, cam arms keyed to the upper ends of said shafts, a lever having one end pivotally supported on one of said shafts and connected at its opposite end to said piston, and a cam carried by said lever and engaging said cam arms to rotate said shafts toward brake applying position upon actuation of said piston.

9. The combination of claim 8 including spring means between said cam arms tending to move said arms toward brake releasing position, and a spring carried by said support for biasing said piston and lever toward brake releasing position.

ALFRED O. WILLIAMS.